United States Patent [19]
Sundquist

[11] Patent Number: 6,000,296
[45] Date of Patent: Dec. 14, 1999

[54] GATED SELECTOR LEVER AND CONTROLS FOR AUTOMATIC TRANSMISSION AND TRANSFER CASE

[75] Inventor: Drew A. Sundquist, Canton, Mich.

[73] Assignee: Chrysler Corporation, Auburn Hills, Mich.

[21] Appl. No.: 09/050,550

[22] Filed: Mar. 30, 1998

[51] Int. Cl.⁶ ............................ F16H 59/04; F16H 63/36; B60K 17/354
[52] U.S. Cl. .................................... 74/473.12; 74/473.18; 74/473.24; 74/473.36; 180/233; 180/247
[58] Field of Search ................................ 74/335, 473.12, 74/473.18, 473.24, 473.36; 180/233, 247

[56] References Cited

U.S. PATENT DOCUMENTS

| | | | |
|---|---|---|---|
| 4,441,379 | 4/1984 | Malkowski et al. | 74/477 |
| 4,586,583 | 5/1986 | Yamakawa et al. | 180/247 |
| 4,631,984 | 12/1986 | Jones | 74/878 |
| 4,854,413 | 8/1989 | Kameda et al. | 180/247 |
| 4,915,189 | 4/1990 | Sakai | 180/247 |
| 5,052,245 | 10/1991 | Kigoshi | 74/665 T |
| 5,184,523 | 2/1993 | Nyzedatny | 74/471 X |
| 5,845,535 | 12/1998 | Wakabayashi et al. | 74/473.18 |
| 5,862,708 | 1/1999 | Shamoto | 74/473.18 |

*Primary Examiner*—Allan D. Herrmann
*Attorney, Agent, or Firm*—Roland A. Fuller, III

[57] ABSTRACT

An automatic transmission and transfer case operatively mounted in a four wheel drive vehicle controlled by a single selector lever that is moved to predetermined detented positions along a longitudinal gate to select the transmission drive ranges, reverse, neutral and park. A special pivot construction allows the selector lever to be moved laterally with respect to the normal longitudinal movement for transfer case gear ratio changes and neutral selection. A small lateral gate is employed to receive the selector lever located in alignment with the neutral detent position of the automatic transmission requiring the transmission to be in neutral when the transfer case is shifted. When moved into the lateral gate, the selector lever activates electronic controls effecting operation of a motor for shifting transfer case gear ratios and for selecting transfer case neutral.

8 Claims, 5 Drawing Sheets

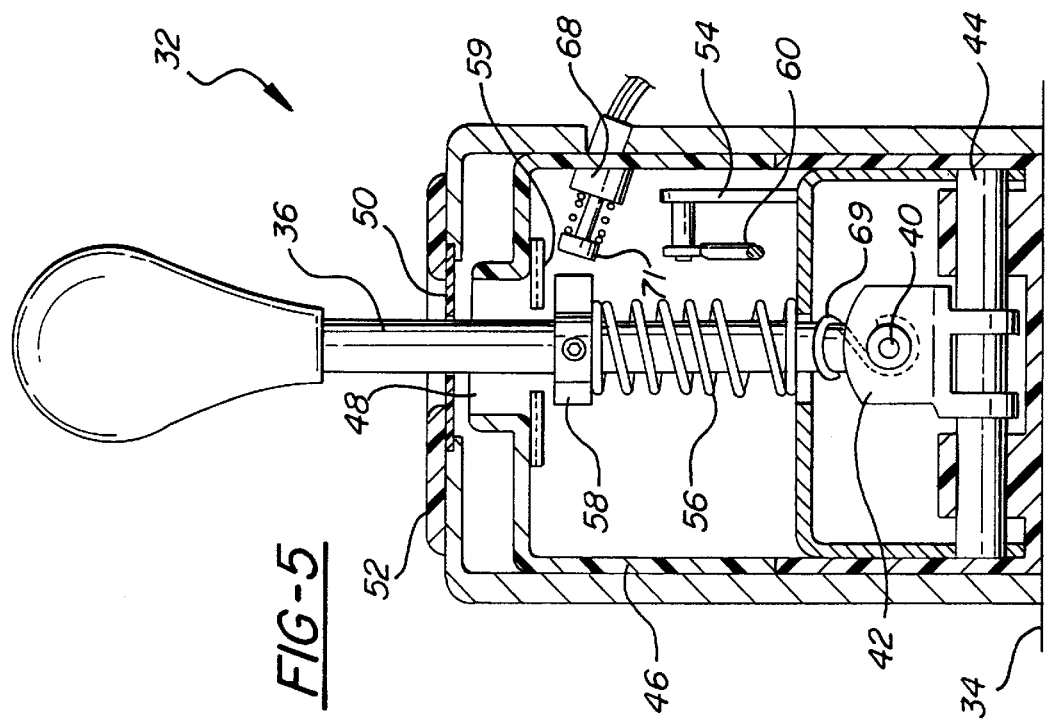
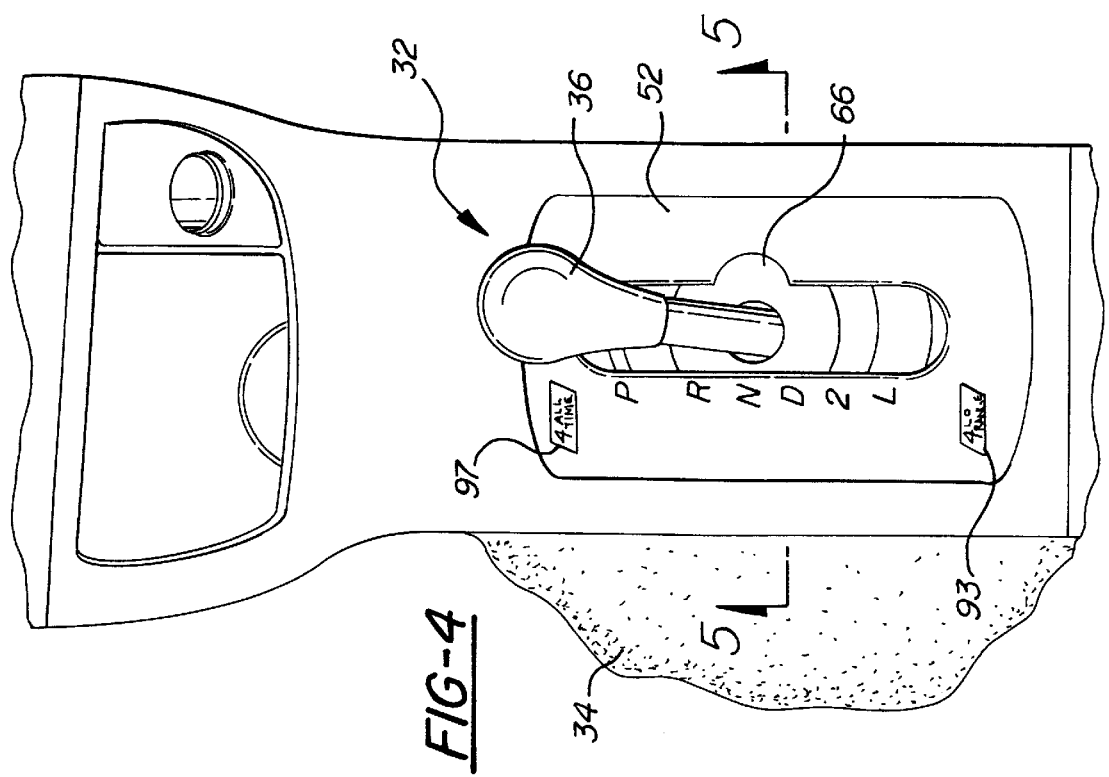

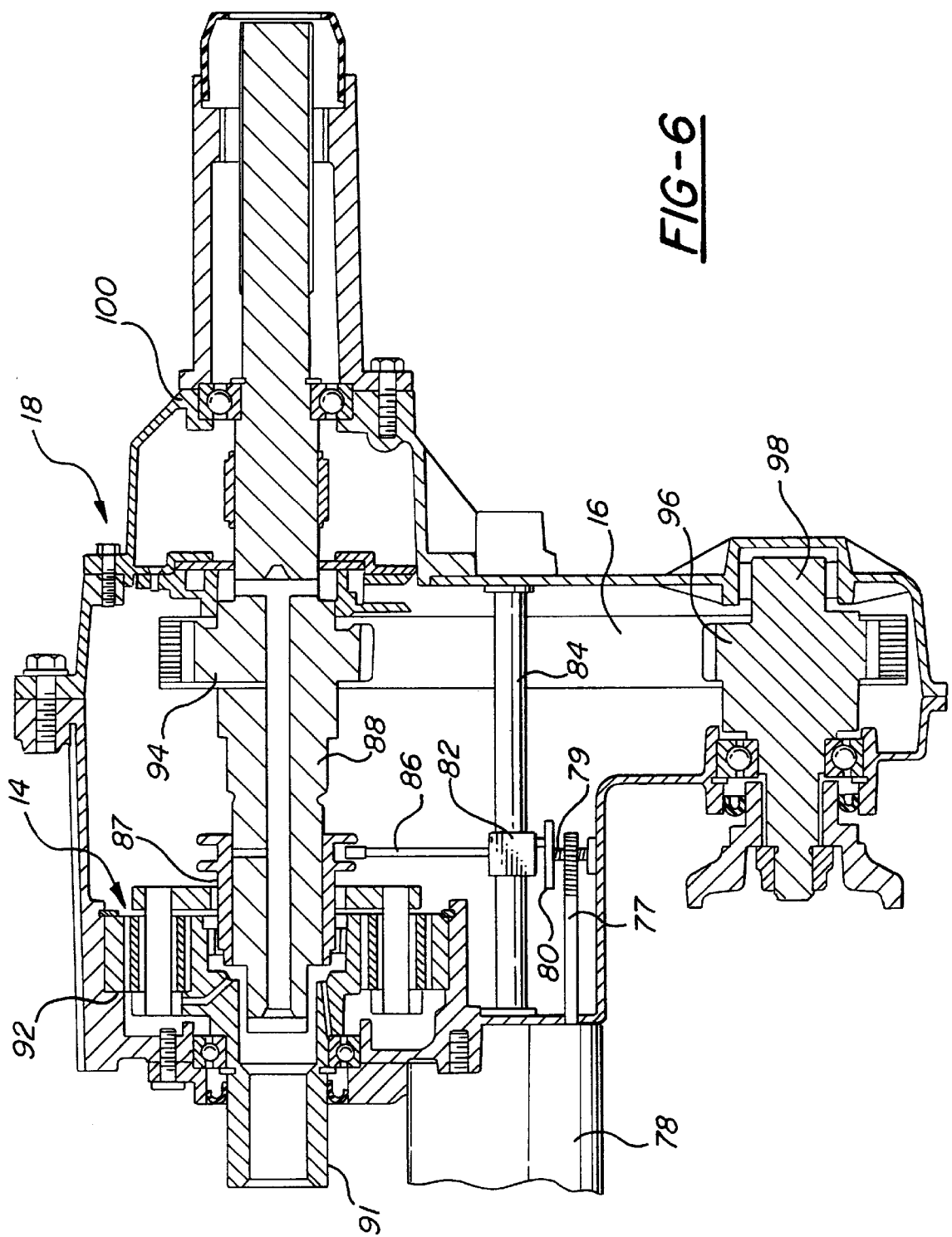

GATED SELECTOR LEVER AND CONTROLS FOR AUTOMATIC TRANSMISSION AND TRANSFER CASE

FIELD OF THE INVENTION

This invention relates to manually operated selector levers for effecting control of automatic transmissions and transfer cases of automotive vehicles for the delivery of engine drive torque to the drive wheels thereof. More particularly, this invention relates to a new and improved gated range selector lever and controls for selectively controlling the operation of automatic change speed transmissions and the electronic operation of associated multi-speed transfer cases for driving the front and rear drive wheels of vehicles.

BACKGROUND OF THE INVENTION

The transfer case in modern vehicles selectively provides power flow or drive torque to the front and rear drive axles of many vehicles for four wheel drive operation and improved vehicle handling and stability. Such transfer cases generally provide an additional gear reduction when placed in low range particularly useful when difficult or off—road conditions occur are encountered.

Prior to the present invention various manual controls have been employed to select and control the operating ranges of automatic transmissions and associated transfer cases drivingly connected to the front and rear drive wheels of wheeled automotive vehicles. Among such controls are a wide range of console mounted transmission range selector levers and associated transfer case levers mounted adjacent to one another. These separate levers have associated operating linkages connected to the associated transmission and transfer cases for moving controls for effecting the selection of the gear ratios of the transmissions and the operation ranges provided by the gearing of the transfer cases.

In the event the transfer case gearing is electronically controlled, external switches such multi-position rotary and rocker type selector switches mounted on the instrument panel are manually pushed, gripped and turned or toggled to operate controls for an electric motor operatively connected to a shift mechanism in the transfer case. Activation of the shift mechanism shifts the transfer gearing between selected operations such as between 4-wheel low, 4-wheel high or to a neutral condition.

While these prior constructions have provided useful and effective control of transmissions and their transfer cases for four wheel drive operation, they generally involve discrete external switching devices that must be located by the operator and physically touched and closed to effect transfer case gear changes.

In other electronic controlled transfer cases multiple switches, complex controls and complicated gate patterns for establishing selector lever movements are employed to effect transmission and transfer gear operations.

DESCRIPTION OF THE INVENTION

In contrast to such prior constructions, the present invention is drawn to new and improved straight-forward selector lever and lever gate patterns and associated selector lever operated controls for both transmission and transfer case operation. This invention is easily used by a vehicle operator and is simplified in construction and operation to augment ease of transmission and transfer case operation to thereby enhance vehicle operation.

More particularly, the present invention is drawn to a new and improved single selector lever manually turned by the vehicle operator on a first axis and manually moved in a longitudinal gate to select park, neutral, reverse and the different forward drive ratios of an automatic change ratio transmission. To effect a gear change in the transfer case the lever is moved to a position along the longitudinal gate in which the transmission is conditioned for neutral operation to unload the transfer case from engine torque. After the neutral automatic transmission position is reached, the lever is momentarily moved into a transversely extending or lateral gate for transfer case control. This movement activates controls so that the transfer case is resultantly shifted to high or low range drives for vehicle propulsion. The lever when maintained in the lateral gate shifts the transfer case to neutral, particularly useful for vehicle towing.

A momentary switch concealed within the selector lever console is operated by the selector lever only when in the lateral gate. This switch when momentarily activated by the selector lever effects the operation of electronic controls for energization of an electric motor for shifting the transfer case gearing between its ratios such as from four wheel high range to four wheel low range or vice versa. After such gear changes in the transfer case, the shift lever is automatically or otherwise moved back into the neutral position along the longitudinal gate and subsequently placed in any selected range for automatic transmission operation for supplying torque to the selected ratio of the transfer case gearing. By maintaining the lever in the lateral gate beyond the predetermined momentary time required to activate the switch to make a range shift, the switch activates controls so that the transfer case is shifted to neutral.

A feature and object of this invention is to provide a new and improved four wheel drive shift system for a vehicle having an automatic transmission and an associated multi-ratio transfer case operatively mounted in the vehicle in which a transmission selector lever is pivotally mounted in the vehicle for fore and aft movement solely along a longitudinal gate to different predetermined positions for selecting the different operations of the automatic transmission and for lateral movement from a neutral automatic transmission position along the longitudinal gate into a laterally extending gate for operating controls that conditioning the transfer case for four wheel low range operation, four wheel high range operation or neutral operation.

These and other features, objects and advantages will become more apparent from the drawings and following specification.

BRIEF DESCRIPTION OF THE DRAWINGS

FIG. 4 is an enlarged pictorial view of the shift console of the unit of FIG. 1;

FIG. 5 is a cross sectional view taken generally along sight lines 5—5 of FIG. 4;

FIG. 6 is a sectional view of the transfer case gearing of the transfer case of FIG. 1;

DETAILED DESCRIPTION OF THE DRAWINGS

Figure 1:
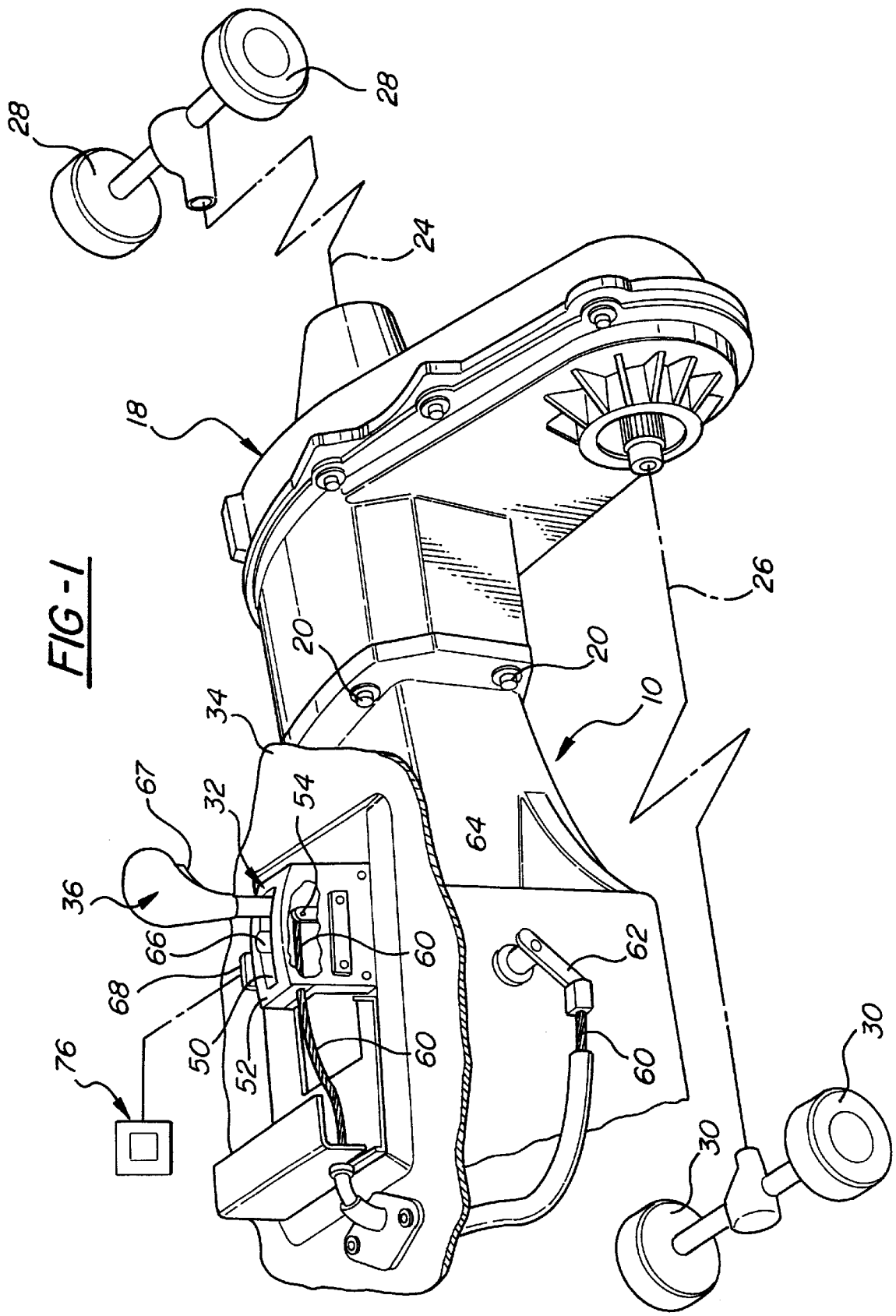
FIG. 1 is a pictorial view of an automatic change speed transmission and associated transfer case controlled by a console mounted shift lever within a vehicle.
Figure 2:
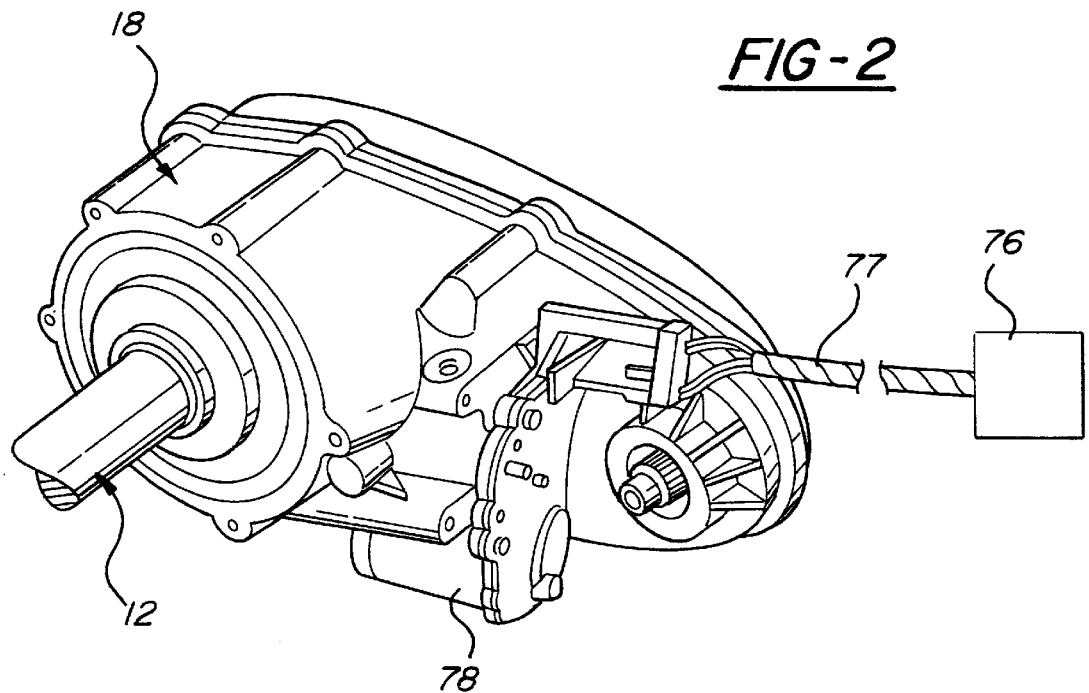
FIG. 2 is a pictorial view of the transfer case of the unit of FIG. 1.
Figure 3:
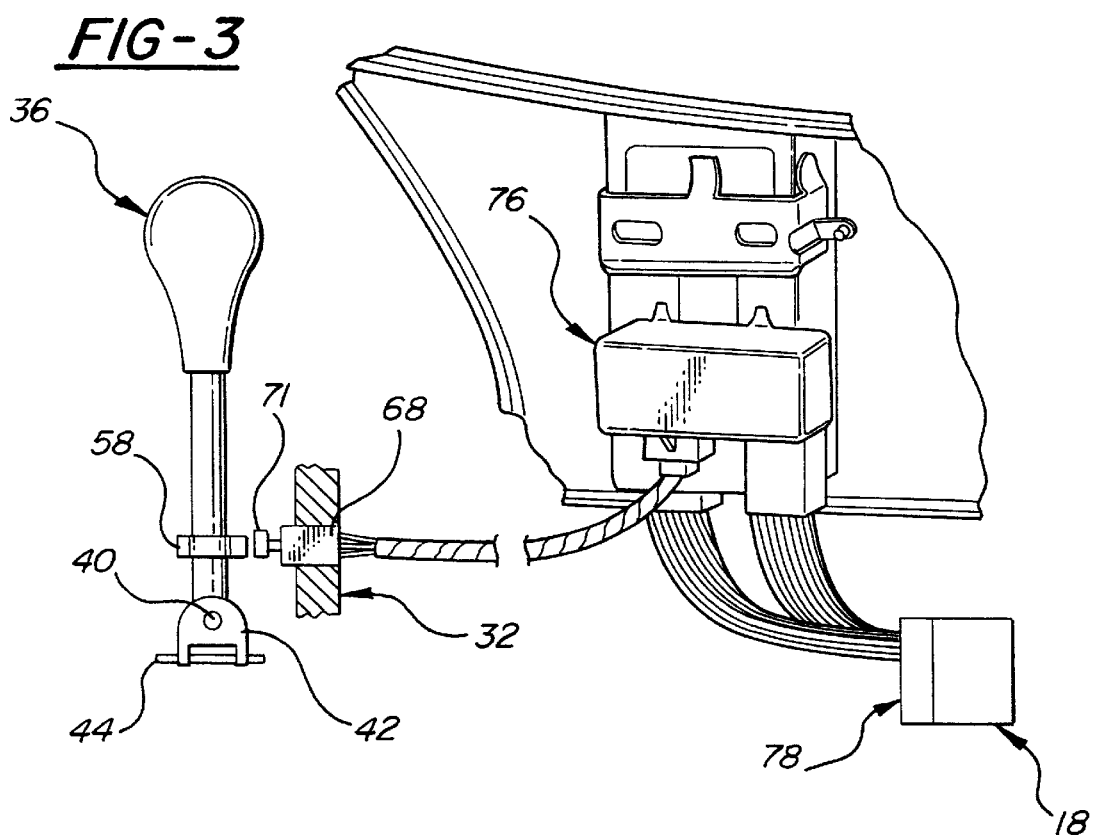
FIG. 3 is a diagramatic view of the selector lever and the momentary switch and controls for the transfer case.

Turning now in greater detail to the drawings illustrating the invention, FIG. 1 depicts a conventional automatic change speed transmission 10 having an output shaft 12 drivingly connected to the change speed planetary gear set 14 and associated drive chain 16 of a conventional transfer case 18. The housing of the transfer case is secured by threaded fasteners 20 to the housing of the transmission 10 and, along with the vehicle engine not shown, is supported by suitable mounts to the chassis or other support structure of the vehicle.

The transfer case gearing and transverse chain 16 is conditionable to change gear ratio and split engine torque delivered thereto from the transmission output shaft 12 to provide separate power paths for rotatably driving the propeller shafts 24 and 26 respectively connected through differentials to the rear and front wheels 28 and 30 as diagrammatically illustrated in FIG. 1.

The transmission 10 is an automatic shifting multi-speed forward drive and reverse drive transmission having multiple operating ranges identified in FIG. 4 by markings L, 2, D, N, R, P respectively, representing low, automatic low—second, automatic low—second—high range drives as well as neutral, reverse drive and park. Mounted within the passenger compartment of the vehicle is a transmission shift console 32 secured to the floor 34 or other suitable support structure of the vehicle. The console has an elongated selector lever 36 mounted for limited pivotal movement therein for selecting the operating ranges of the automatic transmission and controlling the operation of the transfer case gearing.

More particularly, the selector lever 36 is mounted within the console at its inboard end by transversely extending pivot pin 40 to a mount 42 for limited lateral swinging movement. With such lateral movement the vehicle operator can select the drive ranges or neutral operation of the transfer case gearing as will be further explained below. The mount 42 is in turn pivotally supported for limited fore and aft movement on a laterally extending pivot pin 44 supported in an inner housing 46 secured within the console.

As shown in FIGS. 4 and 5, the selector lever 36 extends through a small opening in the connecting span of an inverted U-shaped detent spring support bracket 45 whose spaced legs are pivotally mounted on pin 44. After passing through the opening in the connecting span of the bracket, the selector lever further extends through a longitudinally extending upper slot 48 in the inner housing 46 and through an aligned longitudinally extending lever guide gate 50 provided in a finishing plate 52. As shown, plate 52 is secured within a rectilinear opening in the top of the console.

A cable attachment plate 54 and the U-shaped spring support bracket 45, on which plate 54 is fixed, are pivotally moved in a fore and aft direction along with manually moved the selector lever 36. This attachment plate is operatively connected to the transmission by a cable 60.

More particularly, cable 60 extends from the shift lever 36 via the cable attachment plate 54 through an opening in the floor 34 into connection with a transmission range selector arm 62 operatively mounted to a shaft mounted on the automatic transmission. This shaft 64 is operatively connected to conventional automatic transmission controls such as a selector valve or other transmission control not shown.

With this construction, the selector lever can be manually gripped by the vehicle operator and pivoted in the gated longitudinal or fore and aft direction about pivot pin 44 to selected positions to move the cable and selector arm. This lever movement accordingly sets the transmission for operation in any one of the selected drive ranges, neutral, reverse or vehicle park, as identified by the legends imprinted on the finishing plate 52. A suitable detent 58 mounted for sliding movement on the lever 36 is biased upwardly by the helical spring 56. As shown, the spring is seated on the bracket 45 and extends around the selector lever and biases the detent into detent receiving notches in a suitable detent plate 59 in the console. These notches correspond to the different transmission operation positions for the selector lever as marked on the finishing plate 52. A conventional detent control linkage, not illustrated, operated by the trigger 67 on the selector lever is used to move the detent from the detent notches against the force of helical spring 56 when desired so that the selector lever can be used to select different transmission ratios.

In addition to the longitudinally extending gate 50, the finishing plate is designed with a small lateral gate 66 that communicates with and extends transversely from longitudinal gate 50 at the transmission neutral position N. The gate 66 allows the transmission selector lever 36 to be manually and momentarily pushed to the right from the neutral position N of gate 50 to operate a momentary switch 68 when a change in the gear ratio of the transfer case is desired. A torsion spring 69 anchored to pivot pin 40 and hooked around lever 36 quickly and automatically returns the selector lever 36 into longitudinal gate 50 when released by the vehicle operator.

Figure 7:
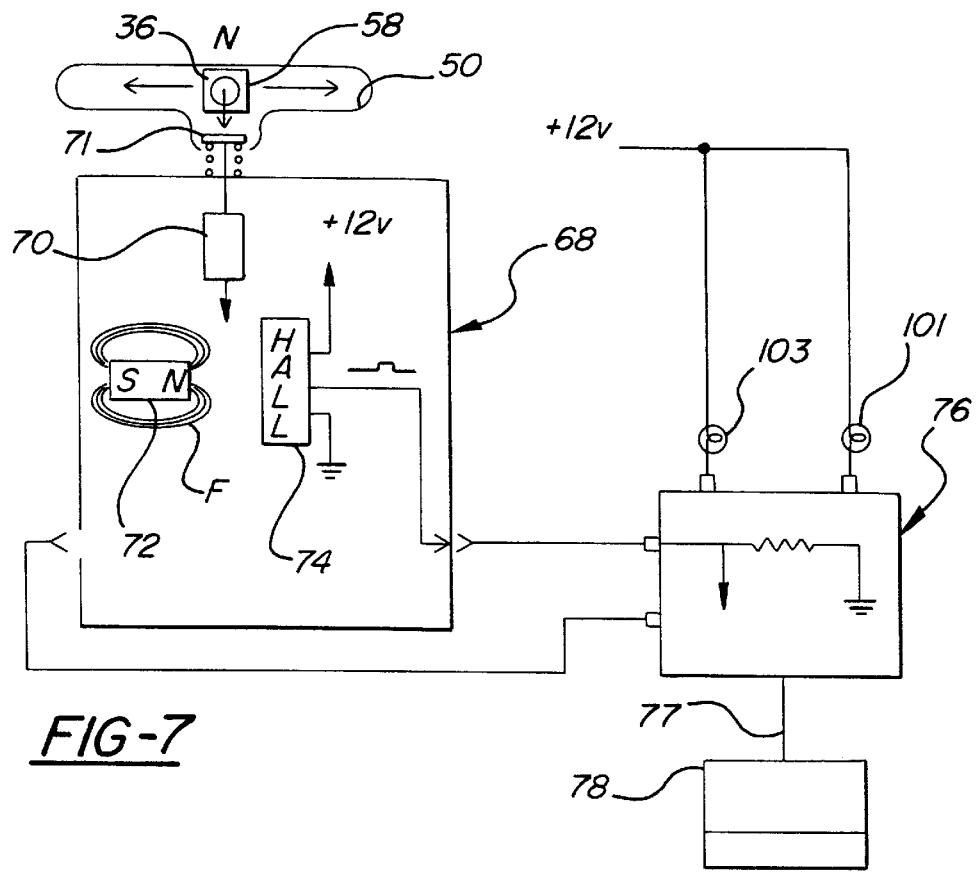
FIG. 7 is a schematic diagram of the switch and controlling for the transfer case.
Figure 8:
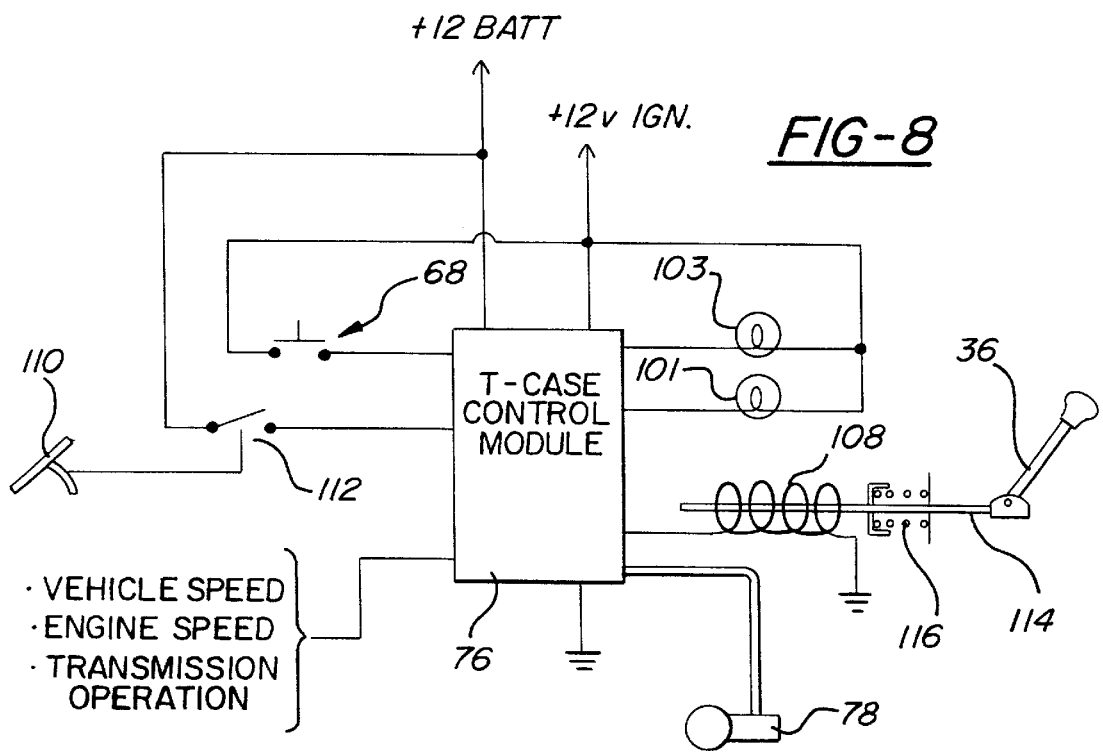
FIG. 8 is a schematic diagram of electric circuitry for this invention.

The switch 68 includes a spring biased push button 71 that is contacted by the detent 58 of the shift lever only when the lever is displaced into the lateral gate 66. Switch 68 can be any suitable momentary switch but as diagrammatically illustrated in FIG. 7, the switch is preferably a "Hall type switch" which comprises a shutter 70 operatively connected to the push button 71. When the lever is manually and momentarily moved into the transverse gate 66 for shifting the transfer case, the shutter 70 is also momentarily moved by the displaced push button into the flux field F of a fixed magnet 72. This reduces or otherwise modifies the strength of the magnetic flux field. Reacting to the changed flux field, the Hall element 74 mounted at fixed distance from the magnet 72 produces a transfer case shift signal that is fed to a transfer case control module 76. The transfer case control module is a conventional unit utilized in automotive engineering for electronically controlling shifts in transfer cases. The module recognizing or knowing that the transfer case is in high speed, low speed range or neutral from the previous operation, outputs a signal that is in accordance with the transmission case shift change instruction from the vehicle operator.

This output signal is fed to energize a reversible electric motor and encoder 78 mounted on the transfer case 18. Motor 78 has a gear reduced output shaft 77 that turns a sector drive shaft 79 drivingly connected to a shift sector 80. The shift sector has a cam slot, not shown, which receives a pin of a shift fork slide 82 mounted for linear sliding movement on support rod 84 in the transfer case. The slide 82 is operatively connected by a shift fork 86 to a shift collar 87 splined on main shaft 88 in the transfer case.

Assuming that the transfer case is in high range with the transmission driven input 91 drivingly connected by the collar 87 to the main shaft for on road operation and the operator has momentarily moved the selector lever into the transverse gate 66 for a transfer case shift into low range for off road operation, the shift collar is linearly moved by the shift fork on energization of the motor 78. This conditions the planetary gear set to shift from a hi range drive condition to a low range drive condition. In the low range position, the planetary gear set 92 is conditioned for speed reduction and torque multiplication with carrier output to the shift collar and main shaft 88 drivingly connected to rear wheels 24.

The main shaft 88 has a chain drive gear 94 fixed thereon which meshes with the chain 16 that routes around a front wheel drive spur gear 96 integral with the front wheel drive output shaft 98 journaled in the housing of the transfer case. The output shaft 98 is drivingly connected to the front wheel drive propeller shaft 26 while the main shaft 88 extends through a rear extension 100 attached to the transfer case housing for drive connection with the rear wheel propeller shaft 24.

With the transfer case in low range, the control module effects energization of low range indicator lamp 101; the circuitry to the all time or high speed lamp 103 is opened and this lamp is off. The selector lever automatically returned to the neutral transmission position may be moved along the longitudinal gate 50 for selection of the transmission drive ranges or reverse.

When the operator subsequently moves the selector lever laterally from neutral into the transverse gate 66 for an upshift in the transfer case gearing, the momentary switch 68 is again activated which signals the transfer case controller module 76 to upshift ratios in the transfer case from low back to high range in which the high speed or all time lamp 103 is again energized and the low range indicator lamp is deenergized.

To shift the transfer case into neutral, the selector lever 36 is manually held in the switch engaging position in the lateral gate for a time substantially greater than the momentary time required for transfer case ratio shifting. This lever position is held at least for several and up to ten seconds for example. When the selector lever is held for such extended time in the transverse gate, the shutter 70 is resultantly maintained in the magnetic field F. The hall element 74 produces a corresponding output voltage that causes the control transfer control module 76 so that it energizes the motor and encoder 78 to shift the transfer case into the neutral drive. In this position, the shift collar 87 is moved to a neutral position between splined engagement with the sun gear and carrier.

Neutral in the transfer case importantly allows the four wheel drive vehicle to be towed in a recreational mode such as by a motor home. This keeps the rear output of the transmission of the four wheel drive vehicle and the other components free from drive by the road wheels. Both lamps 101 and 103 are deenergized when the transfer case is in neutral.

Ideally, the selector lever 36 is prevented from moving from the neutral position when the transfer case 18 is making a shift. A preferred embodiment of this invention has a solenoid 108 providing a component of a conventional brake-transmission selector ignition interlock which among other duties prevents a manual shifting out of park until the vehicle brake pedal 110 is depressed to open switch 112. This deenergizes the solenoid so that the transmission selector lever 36 is unlocked and can be moved into selected position.

The solenoid 108 is also advantageously employed to move a blocker pin 114 into a blocking position with respect to the selector lever 36 to keep the lever in the lateral gate 66 while the transfer case is shifting gear ratios or shifting to neutral. The transfer case control module 76 receives a signal from shift motor and encoder 78 that the transfer case shift is complete. This effects deenergization of the solenoid 108 so that the spring 116 moves the blocker element from the shift lever. Spring 69 then moves the selector lever back to the neutral position in the longitudinal gate 50 so that the transmission drive ranges can be selected. This selector lever lock-out operation is preferably a momentary operation taking for example the 0.5 second time used for ratio changes in the transfer case. This lock-out eliminates any possibility of gear clash in transmission and the transfer case driving shifts.

While a preferred embodiment of the invention has been shown and described, other embodiments will now become apparent to those skilled in the art. Accordingly, this invention is not to be limited to that which is shown and described but by the following claims.

What is claimed is:

1. A front and rear wheel drive shift system for an engine powered vehicle having an automatic transmission with a plurality of different transmission operations including low range and automatic change speed forward, neutral, reverse and vehicle park and further having an associated low speed, high speed and neutral transfer case drivingly connecting the transmission with the front and rear wheels of the vehicle comprising a transmission selector lever pivotally mounted in the vehicle for movement along a first gate to different predetermined positions for selecting the different operations of the automatic transmission and for movement from a neutral automatic transmission position along the first gate into a second gate extending from said first gate, and an electric control operated by the selector lever when in said second gate for selectively conditioning said transfer case for a four wheel low speed, a four wheel high speed and neutral operation.

2. The control of claim 1, wherein said electric control includes an electric motor and said transfer case is shifted by said electric motor between the low and high speeds and further to neutral and wherein said electric control further includes a momentary switch mechanism associated with said second gate and operated by said selector lever when said lever is moved from the neutral automatic transmission operation in said first gate into said second gate to condition said transfer case for driving said front and rear wheels.

3. The control of claim 2, wherein said momentary switch includes a hall effect device and wherein said hall effect device responds to the position and time that said lever is in said second gate and operating said switch to effect a change in operation of said transfer case.

4. A manual control for a multi-ratio automatic transmission for operative mounting in a vehicle having neutral, reverse and automatic shifting forward drive ranges and for an associated multi-ratio transfer case operatively connecting the transmission to front and rear drive wheels of the vehicle comprising a transmission range selector lever, a longitudinal gate for said lever, a lateral gate for said lever, a pivot mechanism operatively mounting said lever in the vehicle for fore and aft movement along said longitudinal gate and for side movement in said lateral gate, a momentary switch mechanism operated by said selector lever when in said lateral gate, controls including an electronic transfer case control module and an electric motor mechanism operatively connected to said transfer case for shifting said transfer case between ratios and to neutral in response to the operation of said switch mechanism by said selector lever when in said lateral gate.

5. The control of claim 4 and further including a selector lever lock-out which traps said selector lever in said lateral gate when said transfer case is shifting.

6. A four wheel drive shift system for a motor vehicle having an automatic change speed transmission with a plurality of different transmission operations including automatic change speed forward gear ratios, neutral, reverse drive and park, and further having an associated transfer case with a plurality of gear ratios and neutral operatively connected and disposed between said transmission and the front and rear wheels of said vehicle comprising a selector lever mounted for manual movement by the vehicle operator along a first path to different positions therealong for selecting and conditioning said transmission for any one of the transmission operations, a second path for said transmission selector lever extending from said first path and beginning with the neutral position of said first path, a momentary switch operatively mounted in said second path, and electronic controls energized by operation of said momentary switch for shifting ratios in said transfer case when said selector lever is moved into said second path position for changing shift ratios in said transfer case.

7. The system of claim 6, wherein said system includes a shift lever console housing, and wherein said console has an upper surface and said first and second paths are first and second gates which receive and guide said shift lever when manually moved by the vehicle operator.

8. The system of claim 6, and a spring device operatively connected to said selector lever for automatically moving said selector lever back into said first path from said second path when released by said vehicle operator so that said transmission can be shifted from neutral to another transmission operation.

\* \* \* \* \*